United States Patent
Warsager

[15] 3,657,054
[45] Apr. 18, 1972

[54] DECORATING MACHINE FOR TRANSFERRING A DECORATIVE MATERIAL TO AN ARTICLE

[72] Inventor: Rubin Warsager, 483 Forest Street, Kearny, N.J. 07032

[22] Filed: Mar. 27, 1970

[21] Appl. No.: 23,396

[52] U.S. Cl. ............................. 156/542, 156/156, 156/234, 156/238
[51] Int. Cl. ........................................ B65c 3/16, B65c 9/18
[58] Field of Search .................. 156/156, 230, 234, 238, 285, 156/287, 361, 366, 381, 475, 540–542; 101/9, 10; 137/624.11

[56]  References Cited

UNITED STATES PATENTS 3,309,256  3/1967  Warsager ........................... 156/230 X
2,981,432  4/1961  Flood ..................................... 156/475
2,751,701  6/1956  Grupe .................................. 156/238 X Primary Examiner—Benjamin A. Borchelt
Assistant Examiner—James M. Hanley
Attorney—Lewis H. Eslinger, Alvin Sinderbrand and Curtis, Morris & Safford

[57]  ABSTRACT

A hot stamping machine for transferring a decorative material to an article in which a pair of rack gears are attached to a carriage holding a die which reciprocates. The rack gears drive two driven gears at the same velocity thereby rotating the object to be decorated and the transfer tape having the decorative material thereon at the same rate of speed to insure a good quality transfer of tape. The object to be decorated is moved up and down into and out of contact with the die. A rack guide is used to maintain the rack gear and the gear driving the object in constant mesh despite the up and down movement of the object.

5 Claims, 6 Drawing Figures

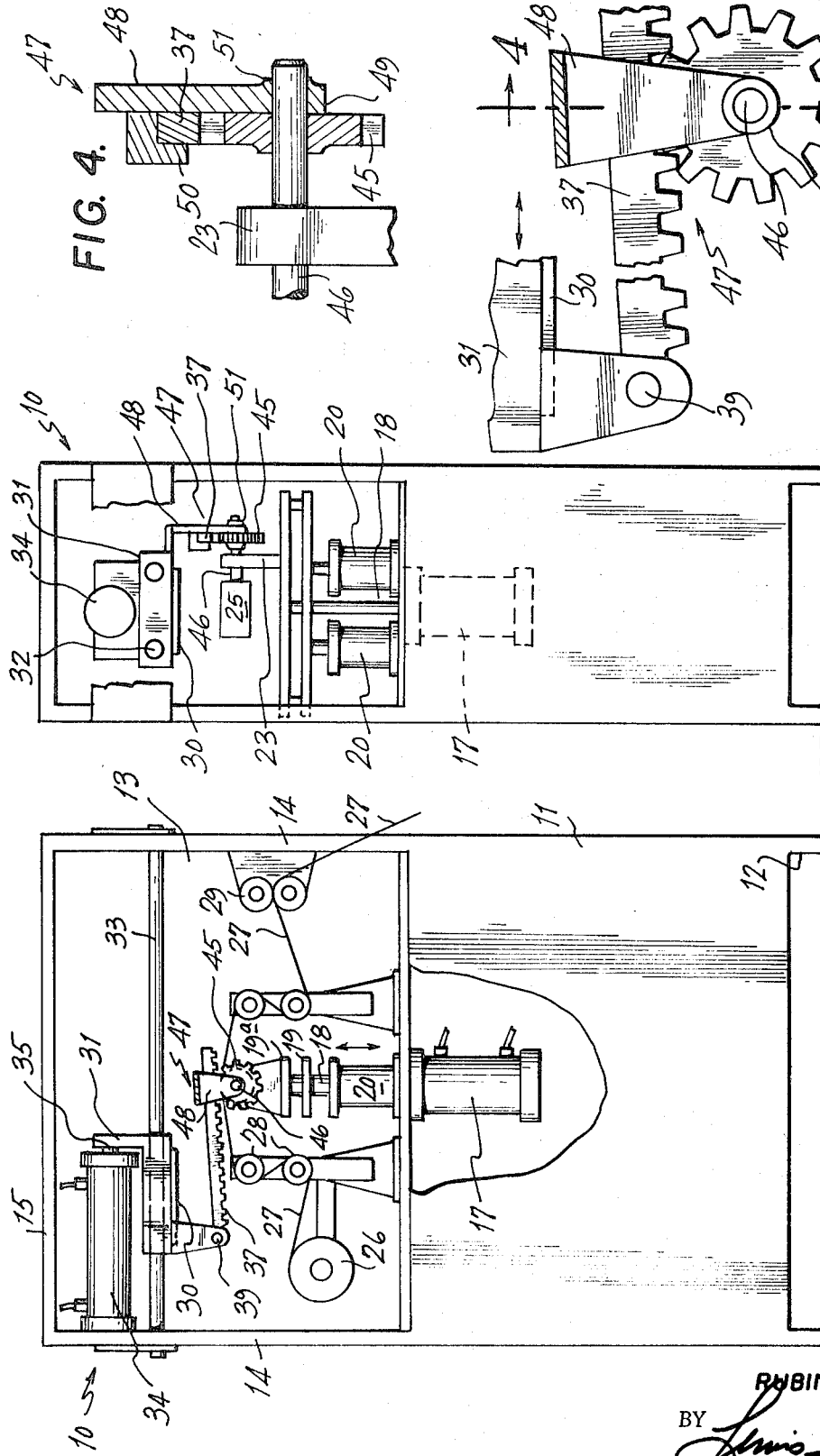

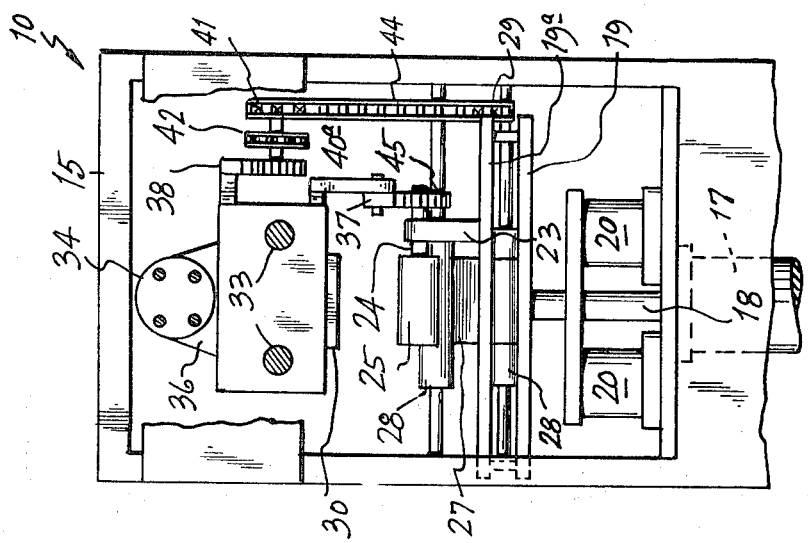
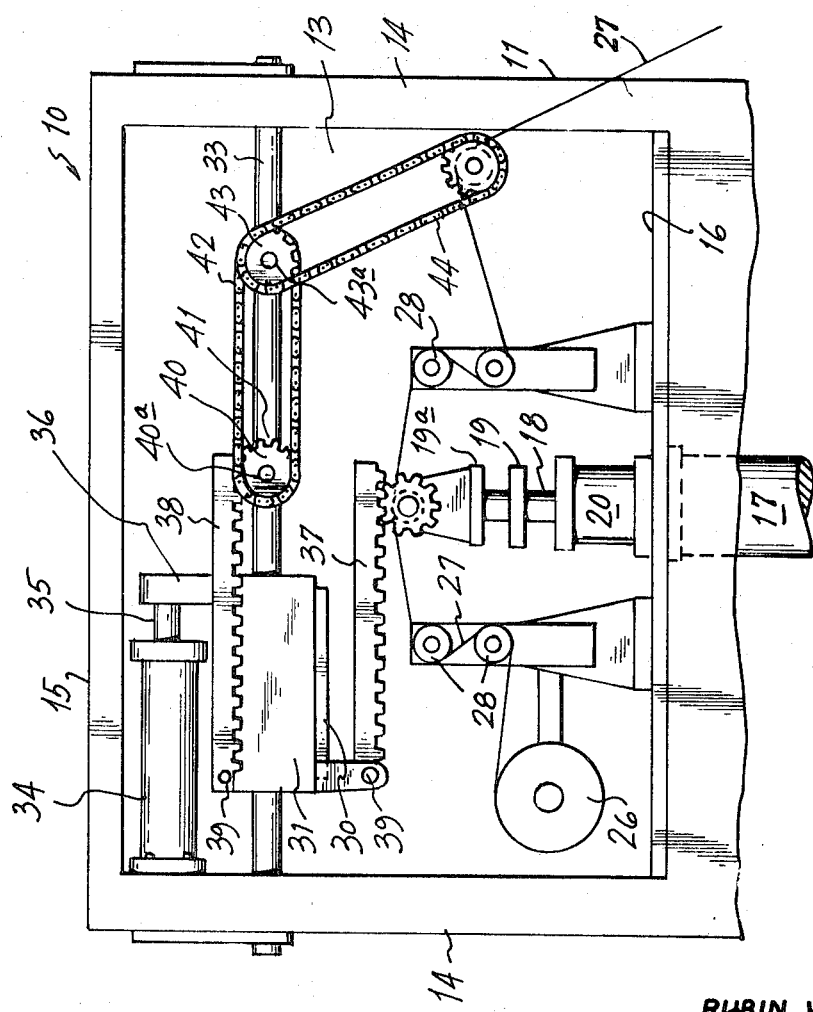

DECORATING MACHINE FOR TRANSFERRING A DECORATIVE MATERIAL TO AN ARTICLE

The present invention relates to the surface decoration of objects which are in commercial use such as perfume bottles or lipstick cases. It is necessary to decorate these items quickly to maintain costs low and the decorative material must have a good degree of permanence in order to assure the consumer that he has a quality product and to promote resale of the item. It is also essential that the decorative material have no blemishes therein, otherwise, it can have an adverse reaction on the consumer as to the quality of the product in the decorated container.

The process and the mechanism used to decorate objects generally takes the form of printing or stamping. One of the more successful techniques developed is that of hot stamping. In this process a tape is used to carry the material, generally a foil, to be transferred to an object. The tape is generally Mylar which has releasably attached thereto a foil, a release material, a web and an adhesive. When heat and pressure are applied to the tape, the release material liquefies and permits the foil to be transferred to an object, and the adhesive insures that the foil is positively secured to the object.

A machine that has successfully demonstrated the transfer of foil to an object is shown and described in my U.S. Pat. No. 3,309,256. This machine does an excellent job in stamping a decorative material upon an object; however, it has been found that unless the surface speed of the object to be decorated, the die and the advance of the foil are identical, slippage occurs, there is tearing of the tape and imperfect transfer of foil to the object is obtained. When the speed of all the aforementioned elements is kept constant, it was found that stretching, ripping and wrinkling of the foil was virtually eliminated. One manner in which the constant velocity of elements is interrupted is when a gear is forced out of engagement with another gear. This can occur because the object is held by a platform which is moved up and down by a pneumatic mechanism. The shock of moving can disengage the gears and relocate them with respect to each other; thereby, adversely affecting their driving relationship and their velocity.

In this invention there is provided a gear and chain or pulley arrangement which will insure a constant velocity arrangement among the object, the die and the foil advance. Also included in the invention is a rack guide which maintains the gears which are subject to disengagement in constant mesh despite voilent movement of the platform retaining the object to be decorated thereon.

It is therefore an object of the invention to provide mechanism to insure the constant velocity of the die, the object and the foil.

It is a further object to permit the speed adjustment of the die, the object and the foil individually in a simple and efficient manner.

It is another object of the invention to insure constant velocity of the die, the object and the foil be providing an inexpensive gear arrangement linking the parts.

It is yet another object of the invention to prevent a drive and a driven gear from becoming disengaged by linking them together with a rack guide.

For a better understanding of the present invention, reference may be had to the accompanying drawings in which:

FIG. 1 is a front view showing the constant velocity mechanism attached to a hot stamping machine;

FIG. 2 is a side view thereof;

FIG. 3 is a detail view of the constant velocity mechanism;

FIG. 4 is a view taken along the line 4—4 of FIG. 3;

FIG. 5 is another embodiment of the invention as shown in front view; and

FIG. 6 is a side view thereof.

For the purpose of illustrating the present invention, a specific type of hot stamping machine is disclosed. It should be understood, however, that the aspects of the present invention are applicable to various types of stamping machines well known to those skilled in the art, and it is not intended to limit the present invention to the specific type of machine illustrated.

Referring now to the drawings, there is illustrated a hot stamping machine generally designated at 10. The housing 11 for the machine is preferably formed of a heavy gauge metal, however, any known material can be used. The machine can be raised off the floor by means of legs 12 or the machine can rest flat on the floor. In either case the machine is firmly anchored to preclude lateral movement of the latter.

The work area 13 is an open area extending from front to rear of the machine and is defined by the side rails 14, a top rail 15 and a rigid horizontal bed 16. Securely fastened to the bed 16 is an air cylinder 17 which is supplied by an outside source (not shown) with air under pressure. The air cylinder 17 has a diaphragm therein (not shown) and air can be fed into the cylinder either above or below the diaphragm. A shaft 18 extends out of the cylinder 17 and is rigidly fixed to the diaphragm. Thus, as the diaphragm moves in an upward or downward direction, the shaft 18 moves correspondingly therewith.

The end of the shaft 18 is fixed to a platform 19 which is constrained to move in a vertical direction only corresponding to movement of the shaft 18. A pair of elevator guides 20 having longitudinal bores therein for the reception of a shaft 21 are provided to supply rigidity and stability to the platform 19, 19a. The shafts 21 are free to move in their respective bores and are designed to have a close sliding fit. By utilizing these elevator guides, the platform 19 is firmly constrained to vertical movement without any lateral rocking of the platform. The platform 19 can include an upper part 19a rigidly held to the lower part 19 by posts or it can be a unitary platform.

Mounted on top of and securely fastened thereto is a housing 23 which can have gears therein. An arm 24 which can be in the form of mandrel is rotatably secured to the housing 23 whereby the arm is free to rotate or it can be positively driven through a gear arrangement within the housing 23. The object 25 to be decorated is placed on the mandrel 24 such that it can be either rotated or held stationary thereon.

A reel 26 is rotatably mounted on the housing 10 and a tape 27 is wound on the reel. The tape is preferably Mylar having a foil thereon which is to be transferred in the form of a decorative design to the object 25. The tape 27 is passed over a plurality of tape guides 28. Four guides are shown, however, the number used is a matter of choice. The guides 28 are preferably rollers having a low coefficient of friction and having flanged ends to prevent the tape from moving laterally from the roller. The tape 27 is threaded around the left set of guides 28 as illustrated in FIG. 1 and thence between the object 25 and a die 30 where it is subsequently passed over the right set of guides. The tape 27 is then fit between a pair of pull rollers 29. These rollers have a surface thereon having a relatively high coefficient of friction or any type of known surface which will grip the tape, for example, a knurled surface can be applied to the rollers. The rollers 29 are rotatably mounted on the housing 10 and can be driven by a motor (not shown) or they can be actuated by hand to advance the tape 28 after the foil carried by the tape has been transferred to the object 25. Thus, by rotating one or both of the rollers 29, a positive grip is exerted on the tape 27 and it is pulled to the right as shown in FIG. 1 so that a fresh portion of tape having foil thereon is placed between the object 25 and the die 30 for each new object placed on the mandrel 24.

The die 30 can have a design etched thereon or it can be plain according to the desires of the user and depending upon how he wishes to decorate the object 25. The die 30 is fixed to a carriage 31 having openings 32 bored therein for the reception of a pair of guide rails 33. The carriage 31 is freely slidable on the guide rails 33 under the influence of an air cylinder 34 or any other motor means. On arm 35 is fixed at one end thereof to the carriage 31 and at its opposite end to a rod 36. A piston in the air cylinder 34 is fixed to the rod 36 and under the influence of air pressure the rod 36 is moved to the right as shown in FIG. 5; thus, the die is moved therewith to contact the tape 27 and the object 25. The die 30 is preferably heated by electrical means (not shown) and by applying heat and pressure to the tape and the object, the foil on the tape can be transferred to the object.

Fixed to the carriage 31 or to the die 30 are a pair of rack gears 37 and 38. Each rack gear is pivotably mounted at one end thereof about pins 39. The upper rack gear 38 drives a pinion gear 40 rotatably mounted on a shaft 40a which is fixed to the rod 33. The gear 40 can have a sprocket 41 fixed thereto or a pulley members (not shown). By means of a chain 42 sprocket 41 is linked to a double sprocket 43 which is rotatably secured to a shaft 43a fastened to the rod 33. The other sprocket 43 also has a chain 44 attached thereto which drives another sprocket (not shown) on the pull roller 29. Thus, it can readily be seen that movement of the carriage 31 to the right as shown in Fig. drives the gear 40 and sprocket 41 which is fixed thereto. The chain 42 then drives the double-parallel sprocket members 43 which in turn drive the chain 44. Since the chain 44 is fixed to the pull roller 29, the latter is rotated and as the rollers grip the tape 27, the tape is advanced until the rollers 29 stop. Instead of using a chain arrangement a full gear system or a pulley and belt drive can be used to rotate the rollers 29.

The lower rack gear 37 engages a pinion gear 45 which is fixed to a shaft 46 which, in turn drives the object 25. The pinion gear 45 is chosen such that it has a pitch diameter identical to the diameter of the object 25 to be decorated. The gear 40 is also chosen so as to have the same pitch diameter as the gear 45. When the carriage 31 moves laterally across the rods 33, the rack gear 37 which is fixed to the carriage drives the pinion gear 45. The object 25 is held by the shafts 24 and 46 which are joined, and the object is thereby rotated. Since the gears 40 and 45 are the same in pitch diameter as the diameter of the object 25 to be decorated the object is driven at the same velocity as the moving die 30 and the pull rollers 29 which are linked to the gear 40 are also driven at the same velocity as the die 30; thus, the tape 27 advances at the same velocity as the die and object are moving.

The elevator or air cylinder 17 raises the object 25 from its lower position to a point where it bears against the die 30 during the lateral movement of the die. As the die 30 traverses the surface of the object 25, it bears on the tape 27 and the pressure and the heat applied to the die enables a transfer of foil on the tape 27 to be impressed into the surface of the object. Since the die 30, the object 25 and the tape 25 are all moving at the same velocity a perfect registration will occur without any tearing, stretching or wrinkling of the foil which is a micro-thin material.

As the elevator 17 moves each new object up and down there is a tendency for the rack gear 37 to separate from the pinion gear 45. In order to obviate this problem, a rack guide 47 is used to firmly maintain the rack gear 37 and the pinion gear 45 engaged. The rack guide includes a plate 48 having an opening 49 drilled therein. A retaining shoe 50, which is an L-shaped member, extends laterally from the plate 48. The shoe 50 is dimensioned to fit snugly over the rack gear 37 and the leg of the L-shaped member prevents the rack gear from moving laterally away from the plate 48. A screw threaded member 51 is threaded onto the shaft 46 thereby maintaining the rack gear 37 and the pinion 45 in constant mating condition.

What is claimed is:

1. In machine for applying a decorative material to an object comprising,
   a. a die reciprocally mounted on the machine,
   b. means for retaining, raising and lowering the object to bring the object into and out of engagement with the die,
   c. a holder mounting a transfer tape such that tape lies between the object and the die whereby as the object is pressed against the die, material is transferred from the transfer tape to the object,
   d. pull rollers for advancing the transfer tape to a new position after each pressing operation, and
   e. synchronizing means to move the die, rotate an object, and advance the transfer tape at the same velocity, said synchronizing means including a pair of rack gears fixed to the die, a first driven gear engaged with one of said rack gears and connected to a sprocket means, a chain driven by said sprocket means and the chain operatively connected to a gear on the pull rollers to rotate the latter upon lateral movement of the die, a second driven gear engaged with the other of said rack gears and fixed to said object retaining means whereby lateral movement of the die rotates the second driven gear and the object, said rack gears having the same pitch diameter, said first and second driven gears having the same pitch diameter, with the pitch diameter of the second driven gear being the same as the diameter of the object, and the pitch diameter of said pull rollers being the same as the diameter of the first driven gear, whereby said transfer tape is advanced and said object is rotated at the same velocity.

2. In a machine for applying decorative material to an object as defined in claim 1, a guide member removably mounted adjacent said second driven gear to maintain its associated rack gear in constant engagement with said second driven gear during the raising and lowering of the object.

3. In a machine for applying a decorative material to an object as defined in claim 2 in which said second driven gear comprises a pinion gear.

4. In a machine for applying a decorative material to an object as defined in claim 3 in which the guide member comprises a plate having an opening therein, and a finger extending laterally from said plate.

5. In a machine for applying a decorative material to an object as defined in claim 4 in which the finger firmly grips said rack gear and the object retaining means has a portion thereof which extends into the opening on the plate, and tightening means to firmly secure said other rack gear and said pinion gear together.

* * * * *